United States Patent [19]

Rulf et al.

[11] 4,219,630

[45] Aug. 26, 1980

[54] POLYMERIZATION PROCESS

[75] Inventors: Donald C. Rulf; Edward F. Gurnee, both of Midland, Mich.

[73] Assignee: The Dow Chemical Company, Midland, Mich.

[21] Appl. No.: 803,928

[22] Filed: Jun. 6, 1977

Related U.S. Application Data

[63] Continuation-in-part of Ser. No. 678,281, Apr. 19, 1976, abandoned.

[51] Int. Cl.² ............................................. C08F 279/06
[52] U.S. Cl. ..................................... 525/243; 525/288; 525/292
[58] Field of Search ..................... 260/880 R; 525/243

[56] References Cited

U.S. PATENT DOCUMENTS

| | | | |
|---|---|---|---|
| 3,461,188 | 8/1969 | Baer | 260/880 R |
| 3,781,383 | 12/1973 | Finestone | 260/880 R |
| 3,883,615 | 5/1975 | Kudo | 260/880 R |

*Primary Examiner*—Paul R. Michl
*Attorney, Agent, or Firm*—R. B. Ingraham

[57] ABSTRACT

In the preparation of impact-resistant alkenyl aromatic resinous polymers such as impact polystyrene containing halogenated monomer such as a brominated methacrylate, improved physical properties are obtained if the brominated monomer is added after phase inversion of the rubber and at a rate sufficiently slow as to maintain the identity of the rubber particles.

3 Claims, No Drawings

POLYMERIZATION PROCESS

This application is a continuation-in-part of application Ser. No. 678,281 filed April 19, 1976, now abandoned.

By the term "alkenyl aromatic polymer" is meant a polymer having polymerized therein at least 50 percent by weight of a hydrocarbon alkenyl aromatic compound having the general formula:

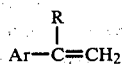

wherein "Ar" represents an aromatic hydrocarbon radical, or an aromatic hydrocarbon radical of the benzene series, and "R" is hydrogen of the methyl radical and another ethylenically unsaturated monomer copolymerizable therewith. Examples of such alkenyl aromatic monomers are styrene, α-methylstyrene, ortho-methylstyrene, meta-methylstyrene, para-methylstyrene, tertiary butyl styrene, ar-ethylstyrene, ar-vinylxylene, and the like.

In many instances it is desirable to prepare impact-resistant (rubber containing) alkenyl aromatic resins which show a reduced burning tendency. Oftentimes, this is accomplished by admixing with the impact-resistant alkenyl aromatic resinous material various halogenated compounds, particularly brominated compounds. Usually the admixture of such compounds in the resin provides a product having poorer physical properties than the unmodified material. In order to overcome this loss of physical properties, reactive halogenated and particularly brominated compounds having a reactive double bond have been copolymerized with styrene or similar alkenyl aromatic monomers to provide polymers of reduced flammability. Some of such monomers and copolymers are described in U.S. Pat. Nos. 3,207,731; 3,162,613; and 3,165,502. One particularly desirable manner of preparing impact-resistant alkenyl aromatic resinous material dissolves a soluble reinforcing rubber such as a polybutadiene rubber in a monomer, for example, styrene. The solution is then subjected to polymerization conditions with agitation and styrene monomer converted largely to styrene polymer. At an early stage in the polymerization two phases are formed with most of the rubber in the first or continuous phase. As polymerization continues the rubber concentrates in the second or discontinuous phase. Usually this phenomena, called phase inversion, occurs somewhere in the region of 10 to 20 percent conversion of the monomer to polymer. The precise conversion value is dependent on the particular rubber, polymerization conditions, additives, rate of agitation and like variables well known to those skilled in the art of phase inversion polymerization of rubber reinforced alkenyl aromatic monomers. Phase inversion of polymerization is well known in the art and described extensively in U.S. Pat. Nos. 2,694,692 and 3,243,481, the teachings of which are herewith incorporated by reference thereto. Attempts to prepare alkenyl aromatic impact-resistant polymers employing the phase inversion polymerization and one or more halogenated, especially brominated ethylenically unsaturated monomers copolymerizable with styrene has resulted in products of the desired bromine content; however, these products generally lacked the desirable and expected physical properties. Generally, the elongation necessary for impact resistance was extremely low and the product unsatisfactory for impact-resistant applications.

It would be desirable if there were available an improved method for the preparation of impact resistant alkenyl aromatic resinous polymers.

It would also be desirable if there were available an improved method for the preparation of impact-resistant bromine containing polymers employing a phase inversion polymerization technique.

It would be desirable if there were available an improved method which would permit the incorporation of halogen-containing monomers into an alkenyl aromatic resinous polymer prepared by phase inversion polymerization process.

These benefits and other advantages in accordance with the present invention are achieved in a process for the preparation of an impact-resistant alkenyl aromatic resinous polymer, the steps of the method comprising providing a solution of a monomer soluble rubber reinforcing agent in at least a partially polymerizable stream containing a hydrocarbon alkenyl aromatic resinous monomer, subjecting the stream to polymerizing conditions, agitating and polymerizing monomer of the stream to thereby cause a rubber rich discontinuous phase to separate within the stream as a plurality of small particles (phase inversion) having diameters within the range of from about 0.2 to 10 microns, the particles being visible using a phase contrast microscope having a magnifying power or between about 600 and 900 diameters maintaining polymerization conditions until at least a major portion of the monomer in the stream has been converted to polymer, subsequently recovering from the stream an impact-resistant alkenyl aromatic resinous polymer having dispersed thereon a plurality of rubber reinforcing particles, the rubber reinforcing particles having occluded therein portions of the alkenyl aromatic resinous polymer, the improvement which comprises adding to the stream containing polymerizable monomer, after phase inversion, a second monomer containing chemically combined therein at least one halogen atom which is known to reduce flammability of an alkenyl aromatic resinous copolymer, the second monomer being copolymerizable with the alkenyl aromatic monomer, the second monomer being added at a rate which is insufficient to destroy the visible rubber particles, the addition of the second monomer being completed prior to conversion of 90 percent of the alkenyl aromatic resinous monomer initially in the polymerizable stream to be polymerized.

The phase inversion point of a phase inversion polymerization is readily determined by observation under a phase contrast microscope. If the phase contrast microscope is focused and the reaction media periodically sampled, the appearance of the rubber particles is readily recognized by anyone having minimal skill with the phase contrast microscope. As the reaction progresses toward completion of the polymerization little or no change is observed in samples taken from the reaction vessel at various stages of the polymerization. The phase contrast microscope observations are particularly valuable in determining the rate of addition of the halogen-containing monomer. It is usually desirable to introduce as much of the halogen-containing monomer as possible as soon as possible into the reaction mixture. For any particular alkenyl aromatic monomer-rubber system, the maximum addition rate can be determined by observation of the mixture under the phase contrast microscope. If the rubber particles disappear, the addition rate is too rapid. Generally the halogen-containing monomers are added at a slower rate very shortly after phase inversion than at a later time when the conversion of monomer to polymer is greater.

The process of the present invention is operable with any of the halogenated monomers copolymerizable with alkenyl aromatic monomers which are known to provide reduced flammability or a reduced tendency to ignite upon exposure to flame.

The temperature pressure and other conditions of polymerization employed in the practice of the present invention are generally those employed in the conventional phase inversion polymerization of alkenyl aromatic resinous polymers containing reinforcing rubbers. Similarly the invention is operable with all the conventional rubbers used in phase inversion polymerization of the alkenyl aromatic resinuous impact-resistant polymer.

By way of further illustration, a plurality of resin samples are prepared in a stirred resin flask at a temperature of 130° under a nitrogen atmosphere. The initial charge to the resin flask is 82 percent styrene, 8 percent of a polybutadiene rubber commercially available under the trade designation of Diene 55 and 10 percent ethylbenzene as a diluent. The reaction mixture in each case is sampled and the sample examined under a phase contrast microscope to determine at what time phase inversion occurs. In the polymerization runs wherein an additional monomer is added after phase inversion, monitoring of the reaction mixture is also carried out to assure that phase inversion is maintained. Runs were made with tribromo-neopentyl methacrylate in a proportion of about 3 parts of styrene to 1 of the methacrylate. Runs were also made with bromostyrene in a similar proportion. Runs were made wherein the bromine-containing monomer was added in accordance with the present invention, that is subsequent to phase inversion and at a rate such that the rubber particles were not destroyed. Two runs were also made wherein no bromine-containing monomer was employed. In two cases indicated by asterisks in the following table, the polymer was twice devolatilized and the physical properties are shown.

TABLE

| | | VOLATILE RESIDUAL | PARTICLE SIZE | $T_y$ | $T_r$ | ELONG. |
|---|---|---|---|---|---|---|
| (Tribromoneopentyl Methacrylate/Styrene Polymers) | | | | | | |
| 1 | A | 2.5% | 2-5μ | 2290 | 2490 | 19.6% |
| 2 | A | 1.7% | 1-5μ | 2500 | 2670 | 17% |
| *3 | A | 0.8% | — | 2770 | 2621 | 8-10% |
| 4 | B | 1.2% | 1-2μ | — | 3960 | 1.6% |
| 5 | B | 2.7% | 2-8μ | — | 2130 | 1.5% |
| 6 | B | 2% | 1-6μ | — | 2250 | 2.5% |
| (Bromostyrene/Styrene Polymers) | | | | | | |
| 7 | A | 1.8% | 2-5μ | 2401 | 3313 | 26% |
| *8 | A | 0.7-1.0% | — | 2611 | 3076 | 14.5% |
| 9 | B | 0.8% | ~1μ | — | 5115 | 2% |
| 10 | B | 0.5% | 1-6μ | 3690 | 3800 | 4.6% |
| (Impact Styrene Polymers) | | | | | | |
| 11 | B | 1.5% | 2-5μ | 3030 | 2812 | 12.8% |
| 12 | B | 1.9% | >2μ | 2445 | 2912 | 23.5% |

*Devolatilized a second time @ 150-162° C. to reduce residuals. A side effect of this is expected to be a decrease in swelling index.
A Made by Method of Invention
B Prior art method all monomers charged before phase inversion
$T_y$ Tensile yield strength psi
$T_r$ Tensile rupture strength psi
Elong.= Elongation As can be readily seen from the foregoing Table, the addition of the halogen-containing monomer in the initial feed of a phase inversion polymerization results in very low values of elongation which are indicative of a brittle polymer whereas addition of halogen-containing monomers in accordance with the present invention, that is, after phase inversion, results in polymers having elongation values comparable with conventional impact polystyrene shown as the last two lines of the Table. Similar results are obtained when other known reinforcing rubbers are employed and when other brominated aromatic and brominated aliphatic vinyl monomers copolymerizable with styrene or other alkenyl aromatic monomers are employed to replace bromo-neopentyl methacrylate or bromostyrene or styrene of the foregoing examples.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a process for the preparation of an impact-resistant alkenyl aromatic resinous polymer, the steps of the method comprising providing a solution consisting essentially of a monomer soluble rubber reinforcing agent in at least a partially polymerizable stream containing a hydrocarbon alkenyl aromatic monomer having the formula

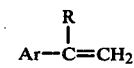

wherein Ar represents an aromatic hydrocarbon radical of the benzene series, R is hydrogen or the methyl radical, subjecting the stream to polymerizing conditions, agitating and polymerizing monomer of the stream to thereby cause a rubber rich discontinuous phase to separate within the stream as a plurality of small particles (phase inversion) having diameters within the range of from about 0.2 to 10 microns, the particles being visible using a phase contrast microscope having a magnifying power of between about 600 and 900 diameters maintaining polymerization conditions until at least a major portion of the monomer in the stream has been converted to polymer and subsequently recovering from the stream an impact-resistant alkenyl aromatic resinous polymer having dispersed thereon a plurality of rubber reinforcing particles, the rubber reinforcing particles having occluded therein portions of the alkenyl aromatic resinous polymer, the improvement which comprises adding to the stream containing polymerizable monomer, after phase inversion, a second monomer containing chemically combined therein at least one halogen atom, the second monomer being known to reduce flammability of an alkenyl aromatic resinous copolymer, the second monomer being copolymerizable with the alkenyl aromatic monomer, the second monomer being added at a rate which is insufficient to destroy the visible rubber particles, the addition of the second monomer being completed prior to conversion of 90 percent of the alkenyl aromatic resinous monomer initially in the polymerizable stream to be polymerized.

2. The method of claim 1 wherein the polymerizable monomer containing at least one halogen atom is bromostyrene.

3. In a process for the preparation of an impact-resistant alkenyl aromatic resinous polymer, the steps of the method comprising providing a solution of a monomer soluble rubber reinforcing agent in at least a partially polymerizable stream containing a hydrocarbon alkenyl aromatic monomer, subjecting the stream to polymerizing conditions, agitating and polymerizing monomer of the stream to thereby cause a rubber rich discontinuous phase to separate within the stream as a plurality of small particles (phase inversion) having diameters within the range of from about 0.2 to 10 microns, the particles being visible using a phase contrast microscope having a magnifying power of between about 600 and 900 diameters maintaining polymerization conditions until at least a major portion of the monomer in the stream has been converted to polymer and subsequently recovering from the stream an impact-resistant alkenyl aromatic resinous polymer having dispersed thereon a plurality of rubber reinforcing particles, the rubber reinforcing particles having occluded therein portions of the alkenyl aromatic resinous polymer, the improvement which comprises adding to the stream containing polymerizable monomer, after phase inversion, tribromoneopentyl methacrylate which is known to reduce flammability of an alkenyl aromatic resinous copolymer, the tribromoneopentyl methacrylate being copolymerizable with the alkenyl aromatic monomer, the tribromoneopentyl methacrylate being added at a rate which is insufficient to destroy the visible rubber particles, the addition of the tribromoneopentyl methacrylate being completed prior to conversion of 90 percent of the alkenyl aromatic resinous monomer initially in the polymerizable stream to be polymerized.

* * * * *

UNITED STATES PATENT AND TRADEMARK OFFICE
CERTIFICATE OF CORRECTION

PATENT NO. : 4,219,630
DATED : August 26, 1980
INVENTOR(S) : Donald C. Rulf; Edward F. Gurnee It is certified that error appears in the above—identified patent and that said Letters Patent is hereby corrected as shown below:

On the title page in paragraph headed ABSTRACT, line 3 following "ing" insert --a--.

Column 1, line 17, delete "of" and insert --or--.
Column 1, line 42, delete "material" and insert --materials--.
Column 1, line 57, delete "of".
Column 2, line 4, following "impact" insert a hyphen.
Column 2, line 30, delete "or" and insert -- of --.
Column 3, line 18, delete "resinuous" and insert --resinous--.
Column 3, line 58 in the Table, run 10, under the column
heading VOLATILE RESIDUAL, delete "1-6µ"; under the
column heading PARTICLE SIZE, delete "3690" and insert
--1-6µ---; under the column heading T, delete "3800"
and insert --3690--; under the column heading T, delete
"4.6%" and insert --3800--; under the column heading
ELONG. insert --4.6%--.

Signed and Sealed this

Third Day of February 1981

[SEAL]

Attest:

RENE D. TEGTMEYER

Attesting Officer    Acting Commissioner of Patents and Trademarks